(12) United States Patent
Tam et al.

(10) Patent No.: US 11,196,587 B2
(45) Date of Patent: Dec. 7, 2021

(54) PERMUTATED RING NETWORK

(71) Applicant: DeGirum Corporation, Menlo Park, CA (US)

(72) Inventors: Kit S. Tam, Menlo Park, CA (US); Winston Lee, Palo Alto, CA (US)

(73) Assignee: DeGirum Corporation, Santa Clara, CA (US)

( * ) Notice: Subject to any disclaimer, the term of this patent is extended or adjusted under 35 U.S.C. 154(b) by 243 days.

(21) Appl. No.: 15/816,374

(22) Filed: Nov. 17, 2017

(65) Prior Publication Data

US 2018/0145850 A1    May 24, 2018

Related U.S. Application Data

(60) Provisional application No. 62/425,798, filed on Nov. 23, 2016.

(51) Int. Cl.
| | |
|---|---|
| *H04L 12/42* | (2006.01) |
| *H04L 12/46* | (2006.01) |
| *H04J 3/08* | (2006.01) |
| *H04L 12/741* | (2013.01) |
| *H04J 3/06* | (2006.01) |

(52) U.S. Cl.
CPC .......... *H04L 12/422* (2013.01); *H04J 3/0658* (2013.01); *H04J 3/085* (2013.01); *H04L 12/4637* (2013.01); *H04L 45/745* (2013.01); *H04L 2012/421* (2013.01)

(58) Field of Classification Search
None
See application file for complete search history.

(56) References Cited

U.S. PATENT DOCUMENTS

| | | | |
|---|---|---|---|
| 4,501,021 A | 2/1985 | Weiss | |
| 5,535,213 A | 7/1996 | Pan et al. | |
| 6,657,969 B1 | 12/2003 | Neuendorff et al. | |
| 6,992,975 B1* | 1/2006 | Daniel | H04L 41/0681 370/221 |
| 7,212,490 B1* | 5/2007 | Kao | H04L 12/42 370/222 |
| 7,509,403 B1 | 3/2009 | Lee et al. | |
| 7,710,878 B1* | 5/2010 | Kubat | H04L 12/43 370/237 |
| 10,459,866 B1* | 10/2019 | Fleming, Jr. | G06F 13/1668 |
| 2001/0038633 A1 | 11/2001 | Robertson et al. | |
| 2002/0089977 A1 | 7/2002 | Chang et al. | |
| 2003/0067871 A1* | 4/2003 | Busi | H04L 29/12009 370/222 |

(Continued)

FOREIGN PATENT DOCUMENTS

| | | |
|---|---|---|
| CN | 103715766 A | 4/2014 |
| JP | H06-332852 A | 12/1994 |

(Continued)

*Primary Examiner* — Peter Chen
*Assistant Examiner* — Jeff Banthrongsack
(74) *Attorney, Agent, or Firm* — Bever, Hoffman & Harms, LLP

(57) ABSTRACT

A permutated ring network includes a plurality of bi-directional source-synchronous ring networks, each having a plurality of data transport stations, and a plurality of communication nodes. Each of the communication nodes is coupled to one of the data transport stations in each of the plurality of bi-directional source-synchronous ring networks.

22 Claims, 14 Drawing Sheets

(56) References Cited

U.S. PATENT DOCUMENTS

| | | |
|---|---|---|
| 2005/0152382 A1 | 7/2005 | Stirling et al. |
| 2006/0072027 A1 | 4/2006 | Shibayama |
| 2007/0255874 A1 | 11/2007 | Jennings |
| 2010/0188972 A1* | 7/2010 | Knapp ................ H04L 12/437 370/226 |
| 2010/0262788 A1* | 10/2010 | Tsien ................ G06F 12/0831 711/146 |
| 2010/0268977 A1 | 10/2010 | Chang |
| 2011/0296110 A1 | 12/2011 | Lilly et al. |
| 2014/0025908 A1 | 1/2014 | Sharma |
| 2014/0043343 A1 | 2/2014 | Iwai et al. |
| 2015/0081934 A1 | 3/2015 | Gupta et al. |
| 2018/0059183 A1 | 3/2018 | Maeda et al. |
| 2018/0173534 A1 | 6/2018 | Peled |

FOREIGN PATENT DOCUMENTS

| | | | |
|---|---|---|---|
| JP | H10-301910 A | 11/1998 | |
| WO | 2016099766 A1 | 6/2016 | |
| WO | 2016105817 A1 | 6/2016 | |
| WO | WO-2016105817 A1 * | 6/2016 | ......... G06F 15/7825 |

\* cited by examiner

| DATA TRANSPORT STATION (COMM CHANNEL 101) | A0 | A1 | A2 | A3 | A4 | A5 | A6 | A7 |
|---|---|---|---|---|---|---|---|---|
| CONNECTED COMM NODE | N1 | N0 | N2 | N3 | N4 | N5 | N6 | N7 |

| DATA TRANSPORT STATION (COMM CHANNEL 102) | B0 | B1 | B2 | B3 | B4 | B5 | B6 | B7 |
|---|---|---|---|---|---|---|---|---|
| CONNECTED COMM NODE | N0 | N4 | N7 | N3 | N1 | N5 | N2 | N6 |

| DATA TRANSPORT STATION (COMM CHANNEL 103) | C0 | C1 | C2 | C3 | C4 | C5 | C6 | C7 |
|---|---|---|---|---|---|---|---|---|
| CONNECTED COMM NODE | N0 | N3 | N6 | N1 | N4 | N2 | N7 | N5 |

| COMM NODE PAIR | # OF HOPS | PATH(S) |
|---|---|---|
| N0 ↔ N1 | 1H | A0-A1 |
| N0 ↔ N2 | 1H | A1-A2 |
| N0 ↔ N3 | 1H | C0-C1 |
| N0 ↔ N4 | 1H | B0-B1 |
| N0 ↔ N5 | 1H | C7-C0 |
| N0 ↔ N6 | 1H | B7-B0 |
| N0 ↔ N7 | 2H | A7-A0-A1<br>C6-C7-C0<br>B0-B1-B2 |
| N1 ↔ N2 | 2H | A0-A1-A2<br>B4-B5-B6<br>C3-C4-C5 |
| N1 ↔ N3 | 1H | B3-B4 |
| N1 ↔ N4 | 1H | C3-C4 |
| N1 ↔ N5 | 1H | B4-B5 |
| N1 ↔ N6 | 1H | C2-C3 |
| N1 ↔ N7 | 1H | A7-A0 |
| N2 ↔ N3 | 1H | A2-A3 |

| COMM NODE PAIR | # OF HOPS | PATH(S) |
|---|---|---|
| N2 ↔ N4 | 1H | C4-C5 |
| N2 ↔ N5 | 1H | B5-B6 |
| N2 ↔ N6 | 1H | B6-B7 |
| N2 ↔ N7 | 1H | C5-C6 |
| N3 ↔ N4 | 1H | A3-A4 |
| N3 ↔ N5 | 2H | A3-A4-A5<br>B3-B4-B5<br>C7-C0-C1 |
| N3 ↔ N6 | 1H | C1-C2 |
| N3 ↔ N7 | 1H | B2-B3 |
| N4 ↔ N5 | 1H | A4-A5 |
| N4 ↔ N6 | 2H | A4-A5-A6<br>B7-B0-B1<br>C2-C3-C4 |
| N4 ↔ N7 | 1H | B1-B2 |
| N5 ↔ N6 | 1H | A5-A6 |
| N5 ↔ N7 | 1H | C6-C7 |
| N6 ↔ N7 | 1H | A6-A7 |

FIG. 3

| CHANNEL 101 LINKS | TRAFFIC | AVAIL BW (1-HOP) |
|---|---|---|
| A0-A1 | CPU_0↔CPU_1<br>CPU_0↔CPU_2<br>CPU_0↔CPU_3 | <1.0 |
| A1-A2 | CPU_1↔CPU_2<br>CPU_0↔CPU_2<br>CPU_0↔CPU_3<br>CPU_1↔CPU_3 | <1.0 |
| A2-A3 | CPU_2↔CPU_3<br>CPU_0↔CPU_3<br>CPU_1↔CPU_3 | <1.0 |

800

| CHANNEL 102 LINKS | TRAFFIC | AVAIL BW (1-HOP) |
|---|---|---|
| B0-B1 | CPU_0↔MB_0 | 1.0 |
| B1-B2 | CPU_1↔MB_0 | 1.0 |
| B2-B3 | CPU_1↔MB_1 | 1.0 |
| B3-B4 | CPU_2↔MB_1 | 1.0 |
| B4-B5 | CPU_2↔MB_2 | 1.0 |
| B5-B6 | CPU_3↔MB_2 | 1.0 |
| B6-B7 | CPU_3↔MB_3 | 1.0 |
| B7-B0 | CPU_0↔MB_3 | 1.0 |

| CHANNEL 103 LINKS | TRAFFIC | AVAIL BW (1-HOP) |
|---|---|---|
| C0-C1 | CPU_0↔MB_2 | 1.0 |
| C1-C2 | CPU_1↔MB_2 | 1.0 |
| C2-C3 | CPU_1↔MB_3 | 1.0 |
| C3-C4 | CPU_2↔MB_3 | 1.0 |
| C4-C5 | CPU_2↔MB_0 | 1.0 |
| C5-C6 | CPU_3↔MB_0 | 1.0 |
| C6-C7 | CPU_3↔MB_1 | 1.0 |
| C7-C0 | CPU_0↔MB_1 | 1.0 |

FIG. 8

| DATA TRANSPORT STATION (COMM CHANNEL 101) | A0 | A1 | A2 | A3 | A4 | A5 | A6 | A7 |
|---|---|---|---|---|---|---|---|---|
| CONNECTED COMM NODE | N1 | N0 | N2 | N3 | N4 | N5 | N6 | N7 |
| DATA TRANSPORT STATION (COMM CHANNEL 102) | B0 | B1 | B2 | B3 | B4 | B5 | B6 | B7 |
| CONNECTED COMM NODE | N0 | N4 | N7 | N3 | N1 | N5 | N2 | N6 |
| DATA TRANSPORT STATION (COMM CHANNEL 103) | C0 | C1 | C2 | C3 | C4 | C5 | C6 | C7 |
| CONNECTED COMM NODE | N0 | N3 | N6 | N1 | N4 | N2 | N7 | N5 |
| DATA TRANSPORT STATION (COMM CHANNEL 104) | D0 | D1 | D2 | D3 | D4 | D5 | D6 | D7 |
| CONNECTED COMM NODE | N0 | N7 | N1 | N2 | N3 | N5 | N4 | N6 |

FIG. 10

| COMM NODE PAIR | # OF HOPS | PATH(S) |
|---|---|---|
| N0 ↔ N1 | 1H | A0-A1 |
| N0 ↔ N2 | 1H | A1-A2 |
| N0 ↔ N3 | 1H | C0-C1 |
| N0 ↔ N4 | 1H | B0-B1 |
| N0 ↔ N5 | 1H | C7-C0 |
| N0 ↔ N6 | 1H | B7-B0 |
| N0 ↔ N7 | 1H | D0-D1 |
| N1 ↔ N2 | 1H | D2-D3 |
| N1 ↔ N3 | 1H | B3-B4 |
| N1 ↔ N4 | 1H | C3-C4 |
| N1 ↔ N5 | 1H | B4-B5 |
| N1 ↔ N6 | 1H | C2-C3 |
| N1 ↔ N7 | 1H | A7-A0 |
| N2 ↔ N3 | 1H | A2-A3 |

| COMM NODE PAIR | # OF HOPS | PATH(S) |
|---|---|---|
| N2 ↔ N4 | 1H | C4-C5 |
| N2 ↔ N5 | 1H | B5-B6 |
| N2 ↔ N6 | 1H | B6-B7 |
| N2 ↔ N7 | 1H | C5-C6 |
| N3 ↔ N4 | 1H | A3-A4 |
| N3 ↔ N5 | 1H | D4-D5 |
| N3 ↔ N6 | 1H | C1-C2 |
| N3 ↔ N7 | 1H | B2-B3 |
| N4 ↔ N5 | 1H | A4-A5 |
| N4 ↔ N6 | 1H | D6-D7 |
| N4 ↔ N7 | 1H | B1-B2 |
| N5 ↔ N6 | 1H | A5-A6 |
| N5 ↔ N7 | 1H | C6-C7 |
| N6 ↔ N7 | 1H | A6-A7 |

FIG. 11

PERMUTATED RING NETWORK

RELATED APPLICATIONS

This application claims priority from U.S. Provisional Patent Application 62/425,798, entitled "Permutated Ring Network", which was filed on Nov. 23, 2016, and is incorporated by reference herein.

FIELD OF THE INVENTION

The present invention relates to a permutated ring network having a plurality of rings, which provides a scalable, high-bandwidth, low-latency point-to-point on-chip communications solution.

RELATED ART

On-chip communication systems exhibit scaling problems, and the number of intra-chip communication nodes and the demand for on chip data bandwidth are ever increasing. High speed serializing/deserializing (SERDES) communication protocols are trending toward providing an operating bandwidth of 100 Gb/sec per pin. Thus, a chip having 1000 pins may require a chip input/output (I/O) bandwidth of up to 100 Terabit/sec. There is a need to provide on-chip communication bandwidth to support these specifications. Examples of systems requiring this bandwidth include a switch fabric for rack scale data center, neural networks, GPU computing systems, system level field programmable gate arrays (FPGAs), a many-core system on a chip (SoC) system, and coherence memory buses for high-performance multi-core and multi-banked last level caches.

Physical limitations for on-chip communications include the length of on-chip wires, which is critical to the delay and operating frequency. Long wires severely degrade performance, as the frequency has a first order effect on the network bandwidth. High fan-out nodes further degrade the bandwidth by creating place and route congestion, and adding more gate and wire delays to the network.

On-chip communication networks are typically implemented as a synchronous system that operates in response to a common clock signal. Clock distribution imposes a great obstacle in building large scale high bandwidth on-chip networks. More specifically, clock skew will limit the operating frequency of the network, and the required clock power may impose limits on the network.

In addition, challenges exist in typical communication network topologies, with regard to scaling up the number of communication nodes and maintaining high operating frequencies.

Typical communication network topologies include: 1) full mesh topology, 2) cross-bar topology and 3) torus network topology. For each of these network topologies, the delay and operating frequency of the system will degrade severely as the wire length of the interconnects increase. Moreover, high fan-out nodes will cause place and route congestions that will further degrade the speed and power performance of the system.

In the full mesh topology, the bandwidth can be defined by the value $N*(N-1)/2$, wherein N is the number of nodes in the network. However, the fan-out of a full mesh topology system increases as the number of nodes (N) increases.

In the cross-bar topology, the number of required multiplexers increases as the number of nodes (N) in the network increases, with a scaling factor of $N**2$. In addition, the number of inputs per multiplexer increases as the number of nodes N increases, with a scaling factor of N.

In the torus network topology, the throughput does not scale as the number of nodes (N) increases. However, the fan-out of the nodes undesirably increases as the number of nodes (N) increase, with a scaling factor of Log(N).

Because these network topologies are implemented using on-chip interconnects that are not perfect wires, the delay and operating frequency of these networks will degrade severely as wire lengths increase. In addition, high fan-out nodes will cause place and route congestions that will degrade the speed and power performance of the networks.

On one hand, more on-chip bandwidth is needed as scaling associated with Moore's law and the emergence of new computing paradigms increase the number of on-chip communication nodes. However, increasing the number of on-chip nodes will degrade the system bandwidth due to increases in wire length and routing congestion when conventional network topologies are used. Consequently, an on-chip bandwidth scaling 'wall' effectively limits the growth of on-chip communication networks.

It would therefore be desirable to have an improved network topology capable of overcoming the on-chip bandwidth scaling wall. It would further be desirable for such a communications network to be readily scalable, capable of providing for communication between a thousand or more on-chip communication nodes. It would further be desirable for such a communications network to be able to operate at a high bandwidth, providing upwards of a peta-bit per second of on-chip communication bandwidth. It would further be desirable for such a communications network to have a low latency (e.g., below 100 ns latency).

SUMMARY

Accordingly, the present invention provides a permutated ring network that includes a plurality of communication nodes and a plurality of bi-directional source-synchronous ring networks, each having a plurality of data transport stations. Each of the communication nodes is coupled to one of the data transport stations in each of the plurality of bi-directional source-synchronous ring networks. A source synchronous technique used to transmit data on the ring networks mitigates the clock distribution challenges. The number of bi-directional source-synchronous ring networks can be selected to provide the bandwidth required by communications between the various communication nodes. In this manner, the permutated ring network of the present invention can be readily scaled.

The present invention will be more fully understood in view of the following description and drawings.

BRIEF DESCRIPTION OF THE DRAWINGS

FIG. 2 is an interconnect matrix that defines connections between the communication nodes and data transport stations of the three ring networks of the permutated ring network of FIG. 1A in accordance with one embodiment of the present invention.

FIG. 3 is a routing table that defines the flow of traffic between the communication nodes through the permutated ring network of FIG. 1A in accordance with one embodiment of the present invention.

FIG. 8 is a bandwidth estimation table that defines the bandwidths between adjacent data transport stations for the routing table of FIG. 7 in accordance with one embodiment of the present invention.

FIG. 10 is an interconnect matrix that defines connections between the communication nodes and data transport stations of the four ring networks of the permutated ring network of FIG. 9 in accordance with one embodiment of the present invention.

FIG. 11 is a routing table that defines the flow of traffic between the communication nodes through the permutated ring network of FIG. 9 in accordance with one embodiment of the present invention.

DETAILED DESCRIPTION

In general, the present invention provides a permutated ring network architecture that includes a plurality of bi-directional source-synchronous communication rings that are shared among a plurality of network nodes. A source synchronous technique is used to mitigate the clock distribution challenges, wherein a transmitting node sends both a clock and data to a receiving node. The receiving node latches the data using the received clock. The clock fan-out is limited to the size of the data bus width. The clock skew is set by the delay relationship between the clock and the corresponding data. Note that the source synchronous technique will only work with a point-to-point interconnect (e.g., a ring network). Numerous on-chip interconnect resources are required to implement a point-to-point network. However, Moore's law predicts that the number of metal layers will scale upward, the metal pitch will decrease, and more wires will be available per unit area as process technologies advance, thereby providing the on-chip interconnect resources required to implement a point-to-point network.

A bi-directional source synchronous ring network provides a building block for the permutated ring network architecture of the present invention. A bi-directional ring network is a simple point-to-point network that provides a fan-out of 1 (i.e., 1 input and 1 output in each direction for each node of the network). However, the bi-directional source synchronous ring network has a fundamental performance limitation, which is referred to herein as 'hopping loss'. Hopping loss occurs when a message is required to 'hop' over nodes located between a transmitting node and a receiving node on a ring network. As described in more detail below, hopping loss is minimized or eliminated in the permutated ring network of the present invention by maximizing the paths available between adjacent nodes. By using a source synchronous signaling technique, high-speed, low skew and low power communication is enabled on the permutated ring network. In particular embodiments, the permutated ring network of the present invention enables around a thousand on-chip communication nodes, and peta-bit per second on-chip communication bandwidth. The permutated ring network provides power efficiency and solutions for a wide range of network sizes, on-chip resource constraints, bandwidth requirements and application specific optimizations.

Figure 1A:
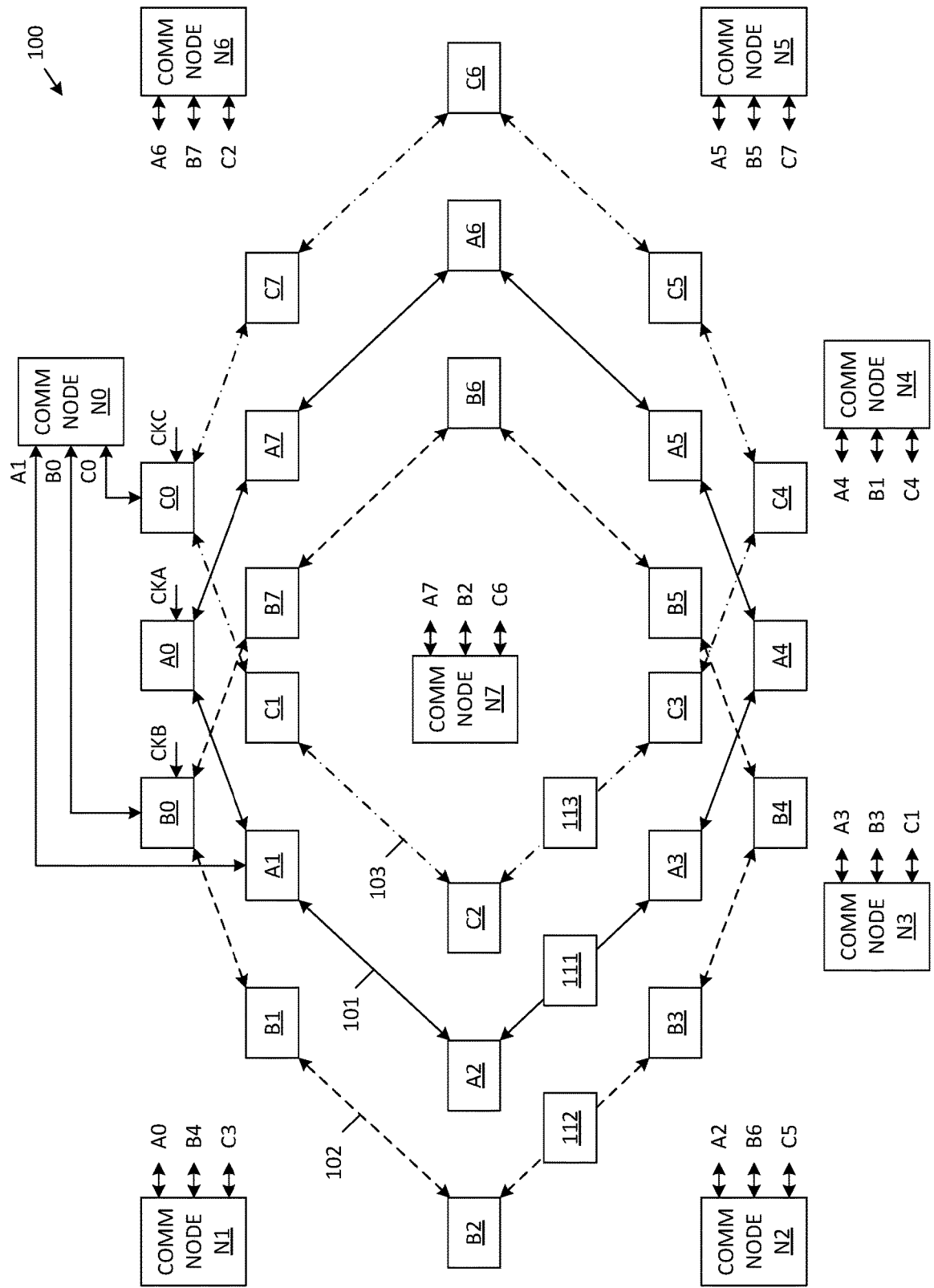
FIG. 1A is a block diagram of a permutated ring network that includes eight communication nodes and three bi-directional source-synchronous ring networks in accordance with one embodiment of the present invention.

FIG. 1A is a block diagram of a permutated ring network 100 in accordance with one embodiment of the present invention. In the illustrated embodiment, permutated ring network 100 includes eight communication nodes N0-N7 and three bi-directional source synchronous ring networks 101, 102 and 103, each of which are fabricated on the same integrated circuit chip. As described in more detail below, each of the ring networks 101-103 functions as a communication channel. Although the illustrated permutated ring network 100 includes eight communication nodes N0-N7 and three communication channels 101-103, it is understood that other numbers of communication nodes and channels can be used in other embodiments. In general, the number of communication nodes on the chip is identified by the value, N, and the number of bi-directional ring networks is identified by the value M. The number of communication channels (M) is selected to provide an appropriate tradeoff between the bandwidth requirements of the communication network and the area-power constraints of the communication network. The bases for making this selection are described in more detail below.

Each of the communication channels 101-103 includes a plurality of data transport station connected by bi-directional links (interconnects). More specifically, communication channel 101 includes data transport stations A0-A7, communication channel 102 includes data transport stations B0-B7 and communication channel 103 includes data transport stations C0-C7. The bi-directional links of communication channel 101 are shown as solid lines that connect the data transport stations A0-A7 in a ring. The bi-directional links of communication channel 102 are shown as dashed lines that connect the data transport stations B0-B7 in a ring. The bi-directional links of communication channel 103 are shown as dashed-dotted lines that connect the data transport stations C0-C7 in a ring. The bi-directional links allow for the simultaneous transmission of data/clock signals in both the clockwise and counterclockwise directions.

In general, each of the data transport stations A0-A7, B0-B7 and C0-C7 provides an interface that enables the transfer of data between the communication nodes N0-N7 and the communication channels 101-103. Details of the structure and operation of data transport stations A0-A7, B0-B7 and C0-C7 and communication nodes communication nodes N0-N7 are provided in more detail below.

In general, each of the communication channels 101-103 is coupled to receive a master clock signal. Thus, in the example of FIG. 1A, communication channels 101, 102 and 103 are coupled to receive master clock signals CKA, CKB and CKC, respectively. In the embodiment illustrated, data transport stations A0, B0 and C0 are coupled to receive the master clock signals CKA, CKB and CKC, respectively. However, in other embodiments, other data transport stations in communication channels 101, 102 and 103 can be coupled to receive the master clock signals CKA, CKB and CKC, respectively. Although three separate master clock signals CKA, CKB and CKC are illustrated, it is understood that each of the master clock signals CKA, CKB and CKC can be derived from a single master clock signal. In the described embodiments, each of the master clock signals CKA, CKB and CKC have the same frequency.

Conventional clock generation circuitry (e.g., a phase locked loop circuit) can be used to generate the master clock signals CKA, CKB and CKC. In the described embodiments, the master clock signals can have a frequency of about 5 GHz or more. However, it is understood that the master clock signals can have other frequencies in other embodiments. The frequency and voltage of the master clock signals can be scaled based on the bandwidth demands and power optimization of the ring network architecture. In the illustrated embodiments, data transport stations A0, B0 and C0 receive the master clock signals CKA, CKB and CKC, respectively. Each of the other data transport stations receives its clock signal from its adjacent neighbor. That is, the master clock signals CKA, CKB and CKC are effectively transmitted to each of the data transport stations of communication channels 101, 102 and 103, respectively, in series.

Figure 1B:
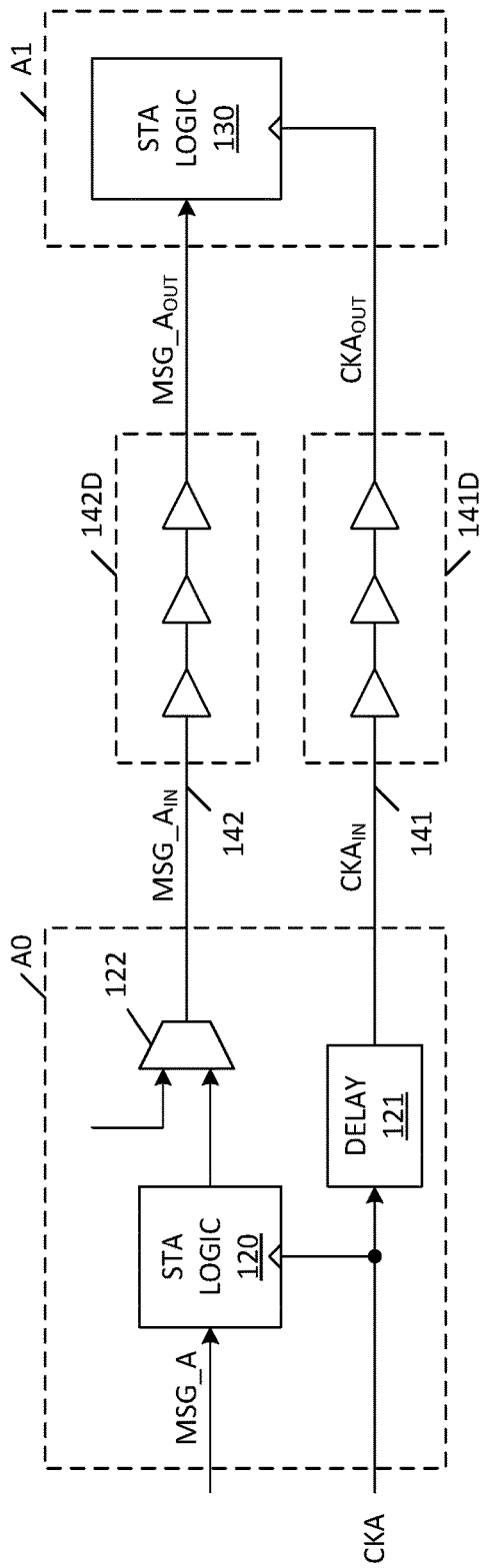
FIG. 1B is a block diagram illustrating one of the communication links of the permutated ring network of FIG. 1A in accordance with one embodiment of the present invention.

Each of the communication channels 101, 102 and 103 operates in a source synchronous manner with respect to its corresponding master clock signal CKA, CKB and CKC, respectively. FIG. 1B is a block diagram illustrating one of the communication links between data transport station A0 and data transport station A1 in communication channel 101, wherein this communication link allows for the transmission of a message MSG_A from station logic 120 within data transport node A0 to station logic 130 within data transport node A1 in a source synchronous manner based on the master clock signal CKA. It is understood that an identical communication link exists to provide for the transmission of messages from data transport station A1 to data transport station A0 in a source synchronous manner based on the master clock signal CKA (i.e., bi-directional communication is provided). It is further understood that each adjacent pair of data transport stations in each of the communication channels 101-103 has similar bi-directional source-synchronous communication links.

Figure 1C:
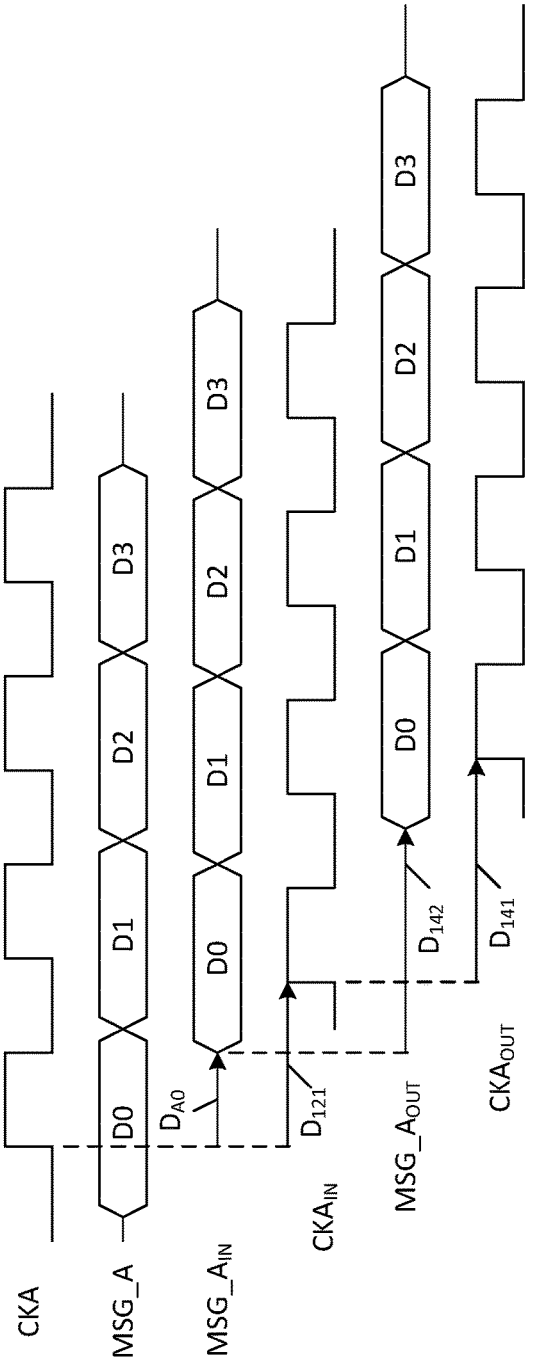
FIG. 1C is a waveform diagram illustrating the source synchronous timing of various signals of FIG. 1B, in accordance with one embodiment of the present invention.

FIG. 1B illustrates relevant portions of data transport stations A0 and A1 for the transmission of messages and clock signals from data transport station A0 to data transport station A1, including station logic 120, delay line 121, multiplexer 122, clock signal line 141, message bus 142 and station logic 130. FIG. 1C is a waveform diagram illustrating the source synchronous timing of various signals of FIG. 1B, in accordance with one embodiment of the present invention.

In general, data transport station A0 can transmit output messages on two paths. In the first path, the message MSG_A received by station logic 120 (e.g., from adjacent data transport station A7) is forwarded to data transport station A1. In this case, station logic 130 forwards the message MSG_A to multiplexer 122. Multiplexer 122 is controlled to route this message as the output message MSG_A$_{IN}$. Station logic 120 and multiplexer 122 introduce a delay D$_{A0}$ with respect to the master clock signal CKA.

In the second path, a message provided by a communication node coupled to data transport station A0 (e.g., communication node N1) is routed through multiplexer 122. Multiplexer 122 is controlled to route this message as the output message MSG_A$_{IN}$. The communication node and the multiplexer 122 introduce the delay D$_{A0}$ to the message, with respect to the master clock signal CKA. FIG. 1C illustrates the delay D$_{A0}$ that exists between the master clock signal CKA and the transmitted message MSG_A$_{IN}$.

Because the transmitted message MSG_0A$_{IN}$ is delayed with respect to the master clock signal CKA, delay line 121 is used to add a delay D$_{121}$ to the master clock signal CKA, thereby creating the transmitted clock signal CKA$_{IN}$ of data transport station A0. The delay D$_{121}$ introduced by delay line 121 is selected to ensure that the clock signal CKA$_{IN}$ has a proper setup and hold time with respect to the message MSG_A$_{IN}$ transmitted from data transport station A0. In one embodiment, the delay D$_{121}$ of delay line 121 is equalized to the node delay D$_{A0}$ described above. That is, the transmitted message MSG_A$_{IN}$ is synchronized to the transmitted clock signal CKA$_{IN}$ using the known internal delays of the data transport station A0 (and the associated communication node(s)).

Note that the structures 141D and 142D used to implement the clock signal line 141 and the message bus 142 between data transport stations A0 and A1 may exhibit significant delays (e.g., buffer delays). The delays introduced by clock signal line structure 141D and the message bus structure 142D are designated as delays D$_{141}$ and D$_{142}$, respectively. Thus, the clock signal A CKA$_{OUT}$ received by data transport station A0 is delayed by D$_{141}$ with respect to the clock signal CKA$_{IN}$ transmitted by data transport station A0. Similarly, the message MSG_A$_{OUT}$ received by data transport station A1 is delayed by D$_{142}$ with respect to the message MSG_A$_{IN}$ transmitted by data transport station A0. This relationship is shown in FIG. 1C. In order to maintain the desired setup and hold times established by data transport station A0 (when generating CKA$_{IN}$ and MSG_A$_{IN}$), the delays D$_{141}$ and D$_{142}$ must be the same. It is therefore very important that the wires and buffers used to implement the clock signal line structure 141D and the message bus structure 142D are highly equalized and balanced in order to minimize setup and hold time loss. That is, the clock path structure 141D and message bus structure 142D should provide substantially identical transmission characteristics between data transport stations A0 and A1, such that the relative phases of the transmitted clock signal CKA$_{IN}$ and the transmitted message MSG_A$_{IN}$ are maintained at the receiving data transport station A1 by received clock signal CKA$_{OUT}$ and received message MSG_A$_{OUT}$ In accordance with the above-described example, the clock path 141 and the message bus 142 operate as a wave pipeline system, wherein messages transmitted on the message bus 142 are latched into the receiving node in a source-synchronous manner using the clock signal transmitted on the clock path 141. In this manner, messages are transmitted from data transport station A0 to data transport station A1 at the frequency of the master clock signal CKA, allowing for fast data transfer from data transport station A0 to data transport station A1. During normal operation, the station logic within each of the data transport stations A0-A7, B0-B7 and C0-C7 latches incoming messages in response to a corresponding received clock signal.

Because point-to-point source-synchronous communication is implemented, the wire and buffer delays $D_{141}$ and $D_{142}$ of the clock signal line structure 141D and the message bus structure 142D will not degrade the operating frequency of the communication channels 101-103. In accordance with one embodiment, the frequencies of the master clock signals CKA, CKB and CKC are higher than the frequencies of the local clock signals used to operate the communication nodes N0-N7.

Because the station logic of the data transport stations have a relatively simple design, the transmission of messages on the permutated ring network can be performed at a relatively high frequency. Communication nodes N0-N7 typically includes a more complicated design, and may operate at a slower frequency than the frequency of the master clock signals CKA, CKB and CKC. That is, while communication nodes N0-N7 may receive messages from the permutated ring network at the frequency of the master clock signals CKA, CKB and CKC, the communication nodes N0-N7 are not required to respond at the frequency of the master clock signals CKA, CKB and CKC.

Note that the circular configuration of the communication channels 101-103 necessitates that messages received by data transport stations A0, B0 and C0 (e.g., the data transport stations that receive the master clock signals CKA, CKB and CKC) must be resynchronized to the master clock signals CKA, CKB and CKC, respectively. For example, a message transmitted from data transport station A7 to data transport station A0 is synchronized to a delayed version of the master clock signal CKA within data transport station A7. As a result, clock domain crossing synchronization is necessary within the data transport station A0 (i.e., the message received from data transport station A7 must be resynchronized with the master clock signal CKA within data transport station A0). In one embodiment, resynchronization circuitry (not shown) performs this synchronizing operation by latching the incoming message into a first flip-flop in response to the incoming clock signal received from data transport station A7. The message provided at the output of this first flip-flop is then latched into a second flip flop in response to the master clock signal CKA. The second flip-flop provides the synchronized message MSG_A, which is provided to station logic 120. This synchronized message MSG_A is stored in station logic 120 in response to the master clock signal CKA.

Returning now to the topography of the permutated ring network 100, each of the communication nodes N0-N7 is coupled to a unique one of the data transport stations A0-A7, B0-B7 and C0-C7 in each of the three communication channels 101-103. For example, communication node N0 is connected to data transport station A1 in communication channel 101, data transport station B0 in communication channel 102 and data transport station C0 in communication channel 103. Table 1 below defines the connections between each of the communication nodes N0-N7 and the data transport stations A0-A7, B0-B7 and C0-C7 in accordance with the described embodiment. Note that the physical connections between the communication nodes N1-N7 and the data transport stations A0-A7, B0-B7 and C0-C7 are not explicitly shown in FIG. 1A for clarity.

TABLE 1

| COMMUNICATION NODE | DATA TRANSPORT STATION IN COMM CHANNEL 101 | DATA TRANSPORT STATION IN COMM CHANNEL 102 | DATA TRANSPORT STATION IN COMM CHANNEL 103 |
|---|---|---|---|
| N0 | A1 | B0 | C0 |
| N1 | A0 | B4 | C3 |
| N2 | A2 | B6 | C5 |
| N3 | A3 | B3 | C1 |
| N4 | A4 | B1 | C4 |
| N5 | A5 | B5 | C7 |
| N6 | A6 | B7 | C2 |
| N7 | A7 | B2 | C6 |

FIG. 2 re-orders the data of Table 1 to provide an interconnect matrix 200 of the three communication channels 101-103, wherein the interconnect matrix 200 is ordered by the data transport stations in each of the communication channels 101-103. This interconnect matrix 200 makes it easy to determine the number of hops between the communication nodes N0-N7 on each of the communication channels 101-103. Note that the communication nodes N0-N7 are coupled to data transport stations having different relative positions in the three communication channels 101-103. As described in more detail below, this configuration allows for the versatile and efficient routing of messages between the communication nodes.

FIG. 3 is a routing table 300, which defines the flow of traffic among the communication nodes N0-N7 through the permutated ring network 100 in accordance with the present embodiment. For example, communication nodes N0 and N1 communicate using the path between data transport stations A0 and A1 on communication channel 101. The number of hops along this path is defined by the number of segments traversed on the communication channel 101. Because data transport stations A0 and A1 are adjacent to one another on communication channel 101 (i.e., one segment exists between data transport stations A0 and A1), the communication path between nodes N0 and N1 consists of one hop (1H).

As illustrated by routing table 300, most of the communication paths between nodes N0-N7 include unique one hop communication paths. However, because there are 24 unique communication segments provided by the three communication channels 101-103, and 28 unique communication node pairs, the permutated ring network 100 is unable to provide unique one hop communication paths between each of the communication node pairs. Thus, routing table 300 provides two-hop (2H) communication paths for four of the communication node pairs (i.e., node pair N0 and N7; node pair N1 and N2; node pair N3 and N5; node pair N4 and N6). For example, nodes N0 and N7 communicate using three different two hop paths, including a first path between data transport stations A7, A0 and A1 on communication channel 101, a second path between data transport stations B0, B1 and B2 on communication channel 102, and a third path between data transport stations C6, C7 and C0 on communication channel 103.

The communication among the data transport stations A0-A7, B0-B7 and C0-C7 will operate at the highest frequency allowed by the source synchronous network. This frequency is not reduced as the number of communication nodes and the number of communication channels scale up. It is understood that each of the communication channels 101-103 includes provisions for initialization, arbitration, flow control and error handling. In one embodiment, these provisions can be provided using well established techniques.

Figure 4:
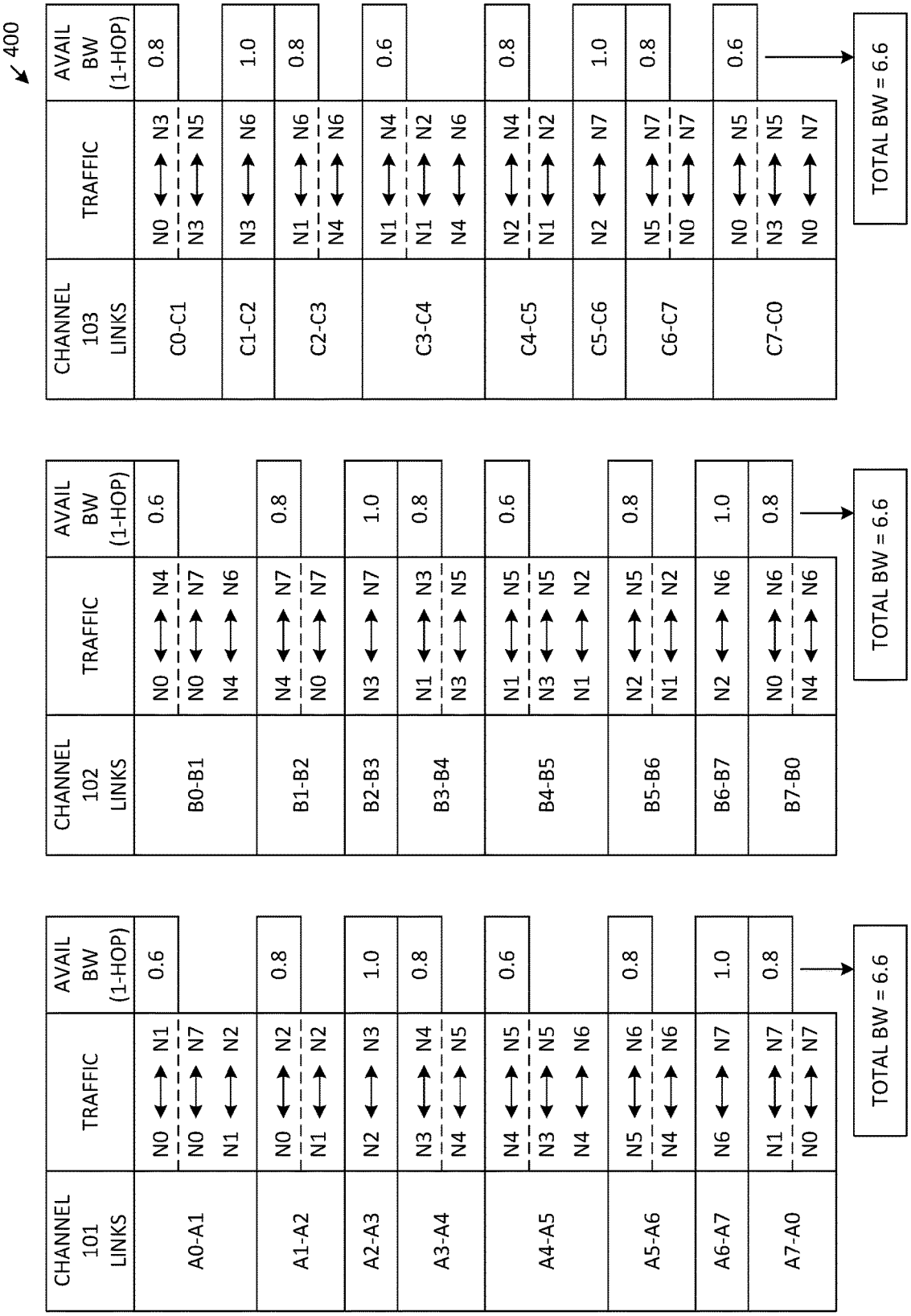
FIG. 4 is a bandwidth estimation table that defines the bandwidths between adjacent data transport stations for the routing table of FIG. 3 in accordance with one embodiment of the present invention.

FIG. 4 is a bandwidth estimation table 400, which defines the bandwidths between adjacent data transport stations for routing table 300 of permutated ring network 100. Thus, based on routing table 300, the link between data transport stations A0 and A1 may be used to transmit data between communication nodes N0 and N1, between communication nodes N0 and N7, and between communication nodes N1 and N2.

In the described example, four pairs of communication nodes communicate using three 2-hop paths. More specifically, communication nodes N0 and N7 communicate using three 2-hop paths A7-A0-A1, C6-C7-C0 and B0-B1-B2; communication nodes N1 and N2 communicate using three 2-hop paths A0-A1-A2, C3-C4-C5 and B4-B5-B6; communication nodes N3 and N5 communicate using three 2-hop paths A3-A4-A5, C7-C0-C1 and B3-B4-B5; and communication nodes N4 and N6 communicate using three 2-hop paths A4-A5-A6, C2-C3-C4 and B7-B0-B1. In the described example, the pairs of communication nodes using three 2-hop paths are considered to be lower capacity pairs, which do not require as much bandwidth as other pairs of communication nodes. In the present example, the bandwidth allotted to communications between each of the pairs of communication nodes using three 2-hop paths is (arbitrarily) limited to 60 percent of the bandwidth available of a link between adjacent data transport stations (e.g., the bandwidth allotted to communications between nodes N0 and N7 is limited to 60% of the bandwidth provided by the link between data transport stations A0 and A1).

Using communication nodes N0 and N7 as an example, there are three 2-Hop paths between nodes N0 and N7 (i.e., A7-A0-A1, C6-C7-C0 and B0-B1-B2). If the allotted bandwidth is divided equally among these three 2-hop paths, then this allotted bandwidth accounts for 20% (60%/3) of the available bandwidth on each of the associated links.

Taking all 12 of the above-described 2-hop paths into account, the bandwidth allotted to communication between nodes N0-N7, N1-N2, N3-N5 and N4-N6 accounts for 20% of the bandwidth on the links between the following data transport stations: A1-A2, A3-A4, A5-A6, A0-A7, B1-B2, B3-B4, B5-B6, B0-B7, C0-C1, C2-C3, C4-C5 and C6-C7. This leaves 80% of the bandwidth of these links available for the communication nodes coupled by 1-hop paths provided by these links. For example, 80 percent of the bandwidth of the link between data transport stations A1 and A2 is allocated to the 1-hop connection between communication nodes N0 and N2, while 20 percent of the bandwidth of the link between data transport stations A1 and A2 is allocated to a 2-hop connection between communication nodes N1 and N2.

Similarly, taking all 12 of the above-described 2-hop paths into account, the bandwidth allotted to communication between nodes N0-N7, N1-N2, N3-N5 and N4-N6 accounts for 40% of the bandwidth on the links between the following data transport stations: A0-A1, A4-A5, B0-B1, B4-B5, C3-C4 and C0-C7. This leaves 60% of the bandwidth of these links available for the communication nodes coupled by 1-hop paths provided by these links. For example, 60 percent of the bandwidth of the link between data transport stations A0 and A1 is allocated to the 1-hop connection between communication nodes N0 and N1, while 20 percent of the bandwidth of the link between data transport stations A0 and A1 is allocated to a 2-hop connection between communication nodes N0 and N7, and 20 percent of the bandwidth of the link between data transport stations A0 and A1 is allocated to a 2-hop connection between communication nodes N1 and N2.

Note that some of the links between data transport stations are not used in any of the twelve 2-Hop paths. In these instances, 100% of the bandwidth of links that are not used in the 2-hop paths is available to connect the associated communication nodes. In the present example, 100% of the bandwidth of the links between data transport stations A2-A3, A6-A7, B2-B3, B6-B7, C1-C2 and C5-C6 is available to provide 1-hop communication between communication node pairs N2-N3, N6-N7, N3-N7, N2-N6, N3-N6 and N2-N7, respectively.

Note that Table 400 shows the 1-Hop bandwidth available between adjacent data transport stations, in accordance with the description provided above. The total 1-Hop bandwidth of each of the communication channels 101-103 is 6.6 in the example of FIGS. 1-4, which is a more than 3× improvement over a simple bi-directional ring network (which has a corresponding 1-Hop bandwidth of 2). Hence, the use of three communication channels in the permutated ring network 100 results in a 3.3× bandwidth improvement over three simple bi-directional ring networks. Note that the bandwidth improvement becomes more significant as the number of communication channels increases.

In the example of FIGS. 1-4, the 1-Hop bandwidth between each pair of communication nodes is not equal. Thus, the placement of various communication nodes in the permutated ring network should be selected to match the communication needs of the various communication nodes. In the example of FIGS. 1-4, it is desirable to locate pairs of communication nodes having higher bandwidth requirements at node locations N2-N3, N6-N7, N3-N7, N2-N6, N3-N6 and N2-N7. Thus, the communication patterns of the communication nodes is an important consideration for the design of the permutated ring network 100. Stated another way, the communication patterns of the nodes are an important consideration for the optimization of the interconnect matrix 300.

As described above, some of the communication paths of permutated ring network 100 require 2-hops, which results in the fundamental above-described performance limitations, which is referred to herein as 'hopping loss'. As described above, permutated ring network 100 provides 24 pairs of 1-hop links, and 28 possible unique connections between the communication nodes N0-N7. Because a unique 1-Hop connection cannot be provided for each possible pair of communication nodes, hopping loss exists (because some connections must be multi-hop connections). In order to maximize the total 1-Hop bandwidth, the interconnect matrix 200 and the routing table 300 are optimized with the following constraints: 1) maximize the number of unique single hop connections, and 2) for the remaining multi-hip connection pairs, maximize the path diversity and minimize the number of hops in each hopping path.

The interconnect matrix 200 and the routing table 300 are determined by the network size and the application specific bandwidth requirements of the communication nodes N0-N7. For example, in networks with limited area or power budgets, the number of channels provisioned will most unlikely be sufficient to completely eliminate the 'hopping loss', so the interconnect matrix and the routing table are designed to maximize the total bandwidths among all the communication nodes. If the network requires that a subset of the communication node pairs must have zero hopping loss in order to avoid significant performance degradation, then the interconnect matrix is designed to satisfy this constraint. Given enough communication channels, a non-blocking, fault-tolerant communication with broadcast ability can be constructed. Various manners of implementing such designs are described in more detail below.

A specific example of the manner in which a permutated ring network can be designed for use with a particular set of communication nodes is described in more detail below in connection with FIGS. 5-8.

Figure 5:
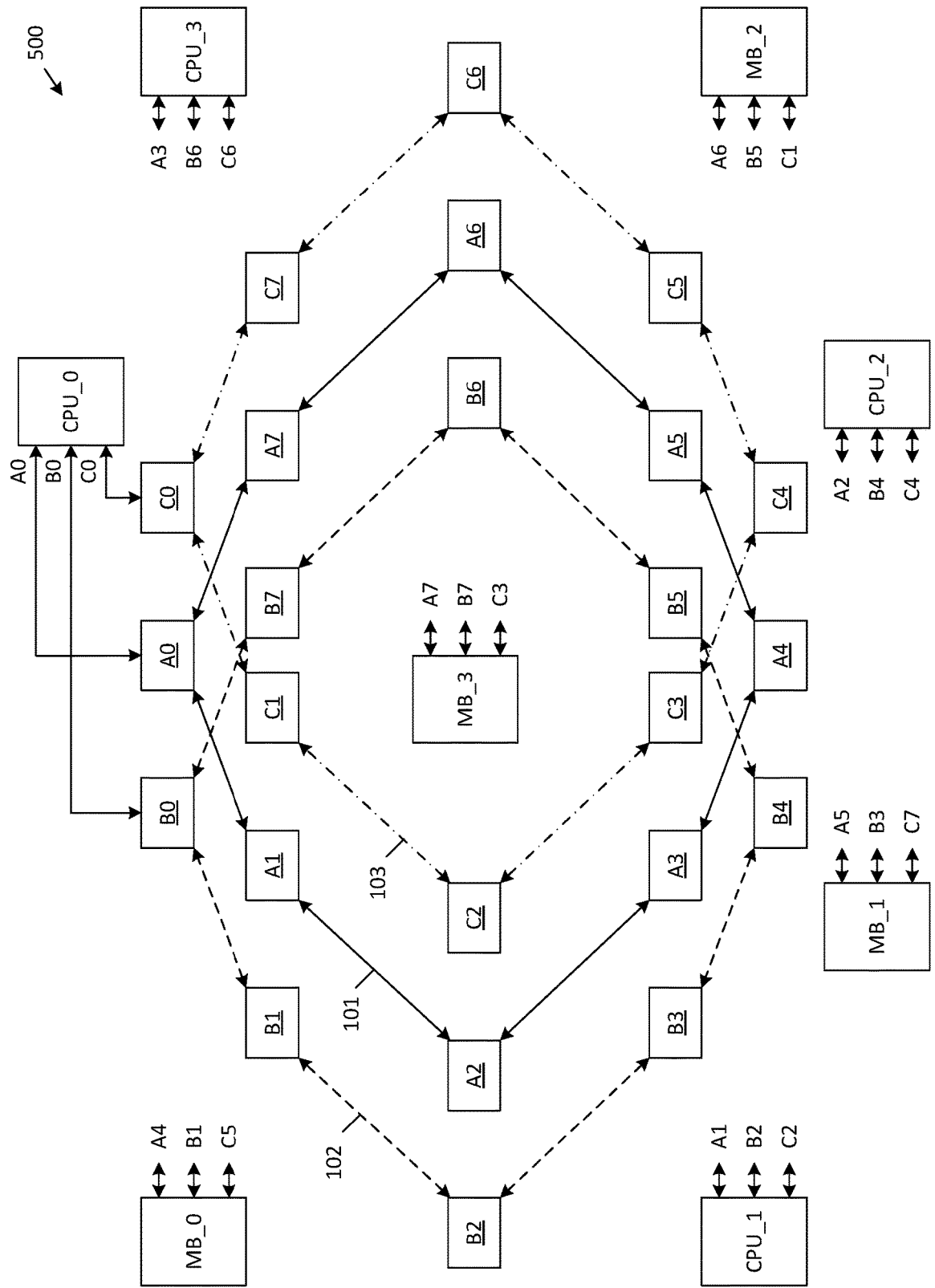
FIG. 5 is a block diagram of a permutated ring network that includes eight communication nodes and three bi-directional source-synchronous ring networks in accordance with an alternate embodiment of the present invention.

FIG. 5 is a block diagram illustrating a permutated ring network 500 that includes eight communication nodes CPU_0, CPU_1, CPU_2, CPU_3, MB_0, MB_1, MB_2 and MB_3, which are connected by communication channels 101-103, including data transport stations A0-A7, B0-B7 and C0-C7. Communication channels 101-103 and data transport stations A0-A7, B0-B7 and C0-C7 have been described above. Each of the communication nodes CPU_0, CPU_1, CPU_2 and CPU_3 is an on-chip processor, and each of the communication nodes MB_0, MB_1, MB_2 and MB_3 is an on-chip memory bank, wherein each of the processors CPU_0, CPU_1, CPU_2 and CPU_3 is able to access each of the memory banks MB_0, MB_1, MB_2 and MB_3, as well as each of the other processors (e.g., processor CPU_0 can access each of processors CPU_1, CPU_2 and CPU_3).

Figure 6:
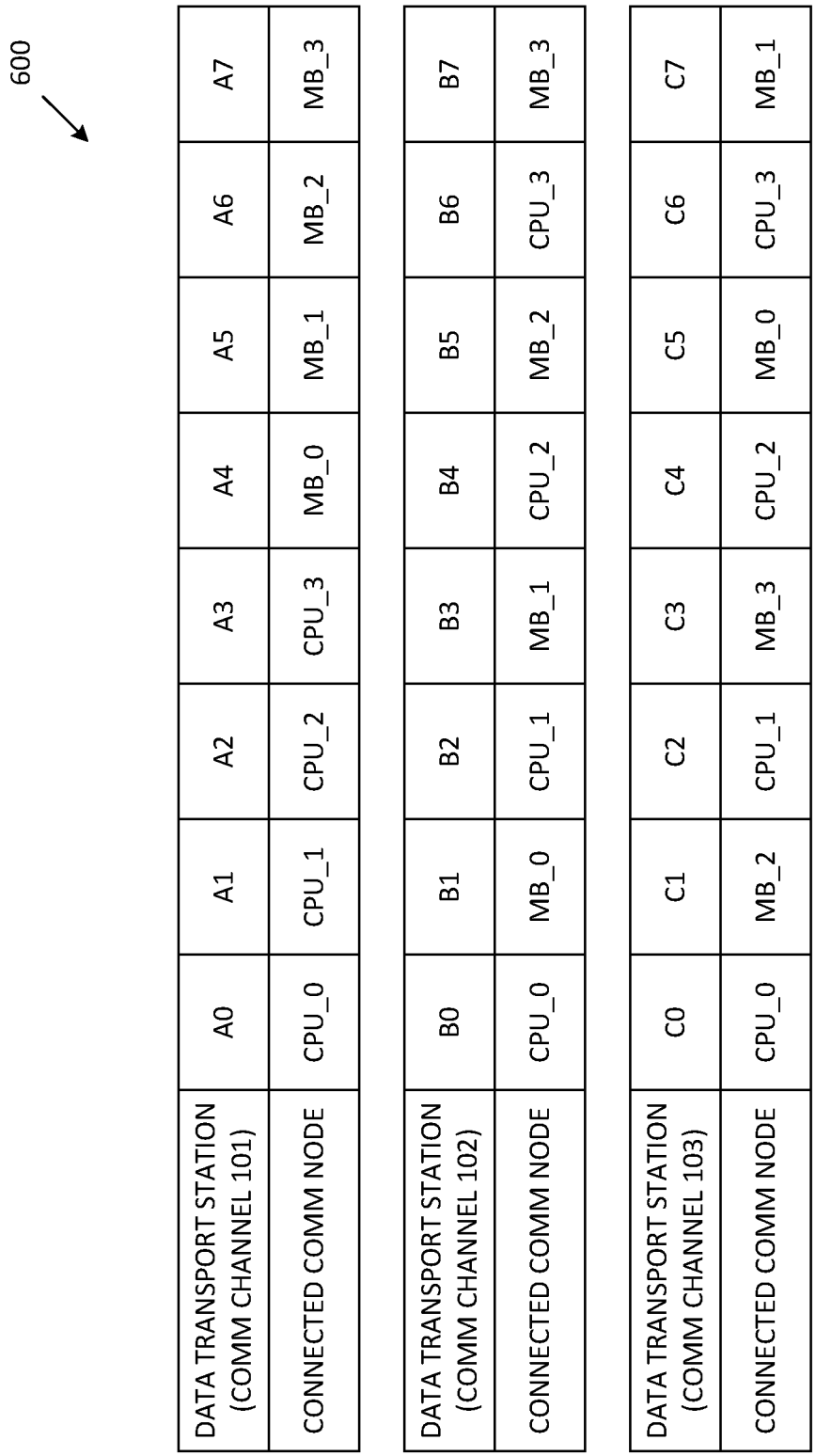
FIG. 6 is an interconnect matrix that defines connections between the communication nodes and data transport stations of the three ring networks of the permutated ring network of FIG. 5 in accordance with one embodiment of the present invention.
Figure 7:
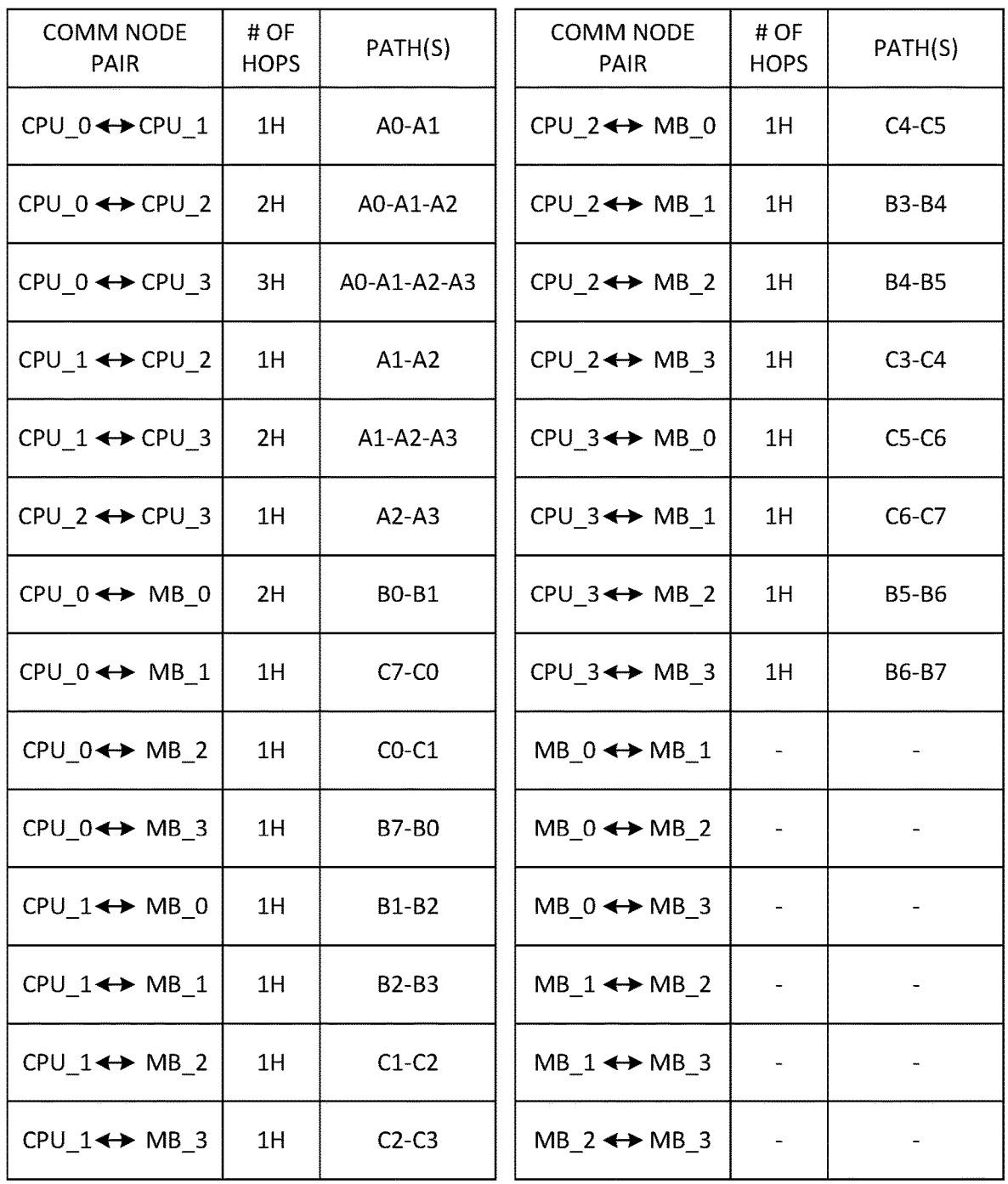
FIG. 7 is a routing table that defines the flow of traffic between the communication nodes through the permutated ring network of FIG. 5 in accordance with one embodiment of the present invention.

FIG. 6 is an interconnect matrix 600 that specifies the connections between the communication nodes CPU_0, CPU_1, CPU_2, CPU_3, MB_0, MB_1, MB_2 and MB_3 and the data transport stations A0-A7, B0-B7 and C0-C7. FIG. 7 is a routing table 700 that specifies the data transport stations used to link the various pairs of communication nodes, as well as the number of hops include in each link. FIG. 8 is a bandwidth estimation table 800, which defines the bandwidths between adjacent data transport stations for routing table 700 of permutated ring network 500.

Interconnect matrix 600 and routing table 700 are selected based on the specific requirements of communication nodes CPU_0, CPU_1, CPU_2, CPU_3, MB_0, MB_1, MB_2 and MB_3 and the data transport stations A0-A7, B0-B7 and C0-C7.

Communication channels 102 and 103 (including data transport stations B0-B7 and C0-C7) are used for communications between processors CPU_0, CPU_1, CPU_2 and CPU_3 and memory banks MB_0, MB_1, MB_2 and MB_3. More specifically, each of the processors CPU_0, CPU_1, CPU_2 and CPU_3 has a unique 1-Hop connection to each of the memory banks MB_0, MB_1, MB_2 and MB_3, using communication channels 102 and 103. The full bandwidth of a 1-Hop link is therefore available for communications between the processors CPU_0, CPU_1, CPU_2 and CPU_3 and the memory banks MB_0, MB_1, MB_2 and MB_3 (see, bandwidth estimation table 800). There are no communication links among the memory banks MB_0, MB_1, MB_2 and MB_3 (as it is not necessary for the memory banks MB_0, MB_1, MB_2 and MB_3 to communicate with one another in the described example).

Communication channel 101 (including data transport stations A0-A7) is used for communications between processors CPU_0, CPU_1, CPU_2 and CPU_3, as well as other memory interconnect functions, including arbitration, synchronization, cache snooping, broadcasting and multicasting. As illustrated by FIG. 8, the available bandwidth between the processors CPU_0-CPU_3 is less than the available bandwidth between the processors CPU_0-CPU_3 and the memory banks MB_0-MB_3. However, in the described example, communications between processors CPU_0, CPU_1, CPU_2 and CPU_3 can tolerate the hopping losses that exist on communication channel 101.

Figure 9:
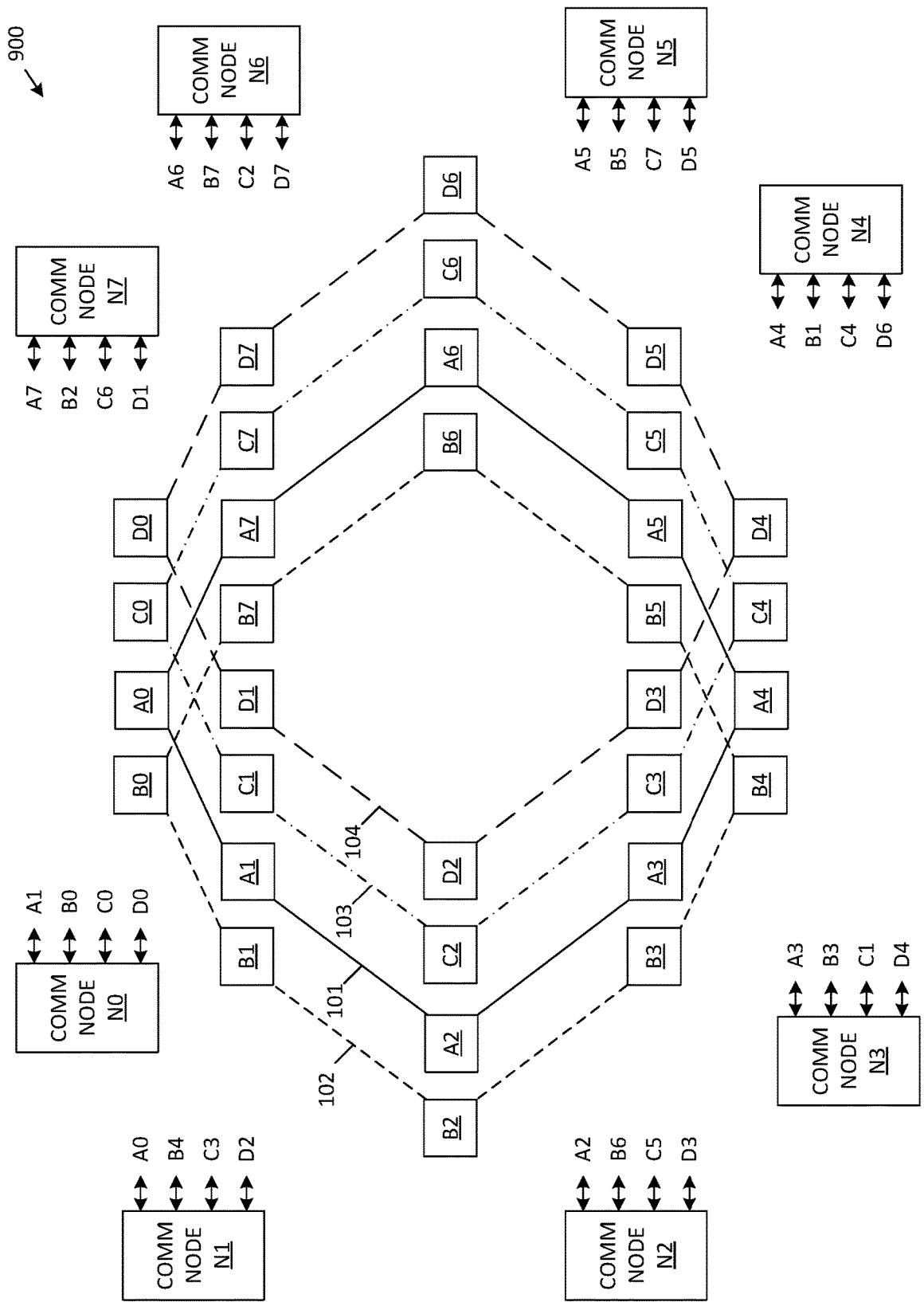
FIG. 9 is a block diagram of a permutated ring network that includes eight communication nodes and four bi-directional source-synchronous ring networks in accordance with an alternate embodiment of the present invention.

Another specific example of the manner in which a permutated ring network can be designed for use with a particular set of communication nodes is described in more detail below in connection with FIGS. 9-11. FIG. 9 is a block diagram illustrating a permutated ring network 900 that includes eight communication nodes N0-N7, which are connected by four communication channels 101-104, including data transport stations A0-A7, B0-B7, C0-C7 and D0-D7. Communication channels 101-103 and data transport stations A0-A7, B0-B7 and C0-C7 have been described above, and the additional communication channel 104 and data transport stations D0-D7 are similar. The addition of communication channel 104 increases the total number of available 1-Hop links to 32, such that each of the 28 possible links between the communication nodes N0-N7 can be implemented using a 1-hop link. As a result, hopping loss can be completely eliminated in permutated ring network 900 (i.e., each communication node can communicate with each other communication node directly), thereby creating a fully non-blocking network. In the described embodiment, the permutated ring network is fabricated on a single integrated circuit chip.

FIG. 10 is an interconnect matrix 1000 that specifies the connections between the communication nodes N0-N7 and the data transport stations A0-A7, B0-B7, C0-C7 and D0-D7. FIG. 11 is a routing table 1100 that specifies the data transport stations used to link the various pairs of communication nodes, as well as the number of hops included in each link. Note that each of these links has an estimated bandwidth of 1.0 (i.e., 100% of the available bandwidth between adjacent data transport stations).

In the embodiment of FIGS. 9-11, there are four pairs of connections between each of the communication nodes N0-N7 and the communication channels 101-104. The bandwidth of the permutated ring network 900 may be limited by this configuration. That is, the peak bandwidth of the permutated ring network 900 may be limited by the interconnects between the communication nodes N0-N7 and the communication channels 101-104. Thus, although the peak bandwidth of the permutated ring network 900 is capable of supporting the bandwidth demand of all nodes N0-N7 communicating among each other simultaneously, there may not be not enough bandwidth to transport the messages from the communication nodes N0-N7 to the communication channels 101-104. In this instance, the communication channels 101-104 will have extra (unused) bandwidth. This extra bandwidth has several advantages, including: 1) less congestion at the communication nodes (e.g., four pairs of wires at each communication node, versus seven pairs of wires, which would otherwise be required to allow a communication node to simultaneously communicate with the seven other communication nodes), 2) each pair of communication nodes can communicate via other channels, such that the permutated ring network 900 provides path diversity (and therefore provides fault tolerance) (That is, because the permutated ring network 900 has excessive bandwidth, each source communication node can optionally use channels other than its assigned channel to communicate to a target communication node. Of course, this will incur some unnecessary hopping loss. However, the extra bandwidth of the permutated ring network 900 can absorb some limited amount of hopping loss), and 3) the communication channels 101-104 of permutated ring network 900 can provide other important communication functions (e.g., broadcasting and multicasting) using the extra bandwidth of the permutated ring network 900.

As described above, each of the data transport stations transfers data between a communication node and a corresponding communication channel (or forwards data between adjacent data transport stations on the corresponding communication channel). Operation of the data transport stations, communication nodes and communication channels will now be described in more detail, using a particular example that includes data transport station A1, communication node N0 and communication channel 101. It is understood that the other data transport stations operate in a manner similar to data transport station A1 (and that the other communication nodes operate in a manner similar to communication node N0).

Figure 12:
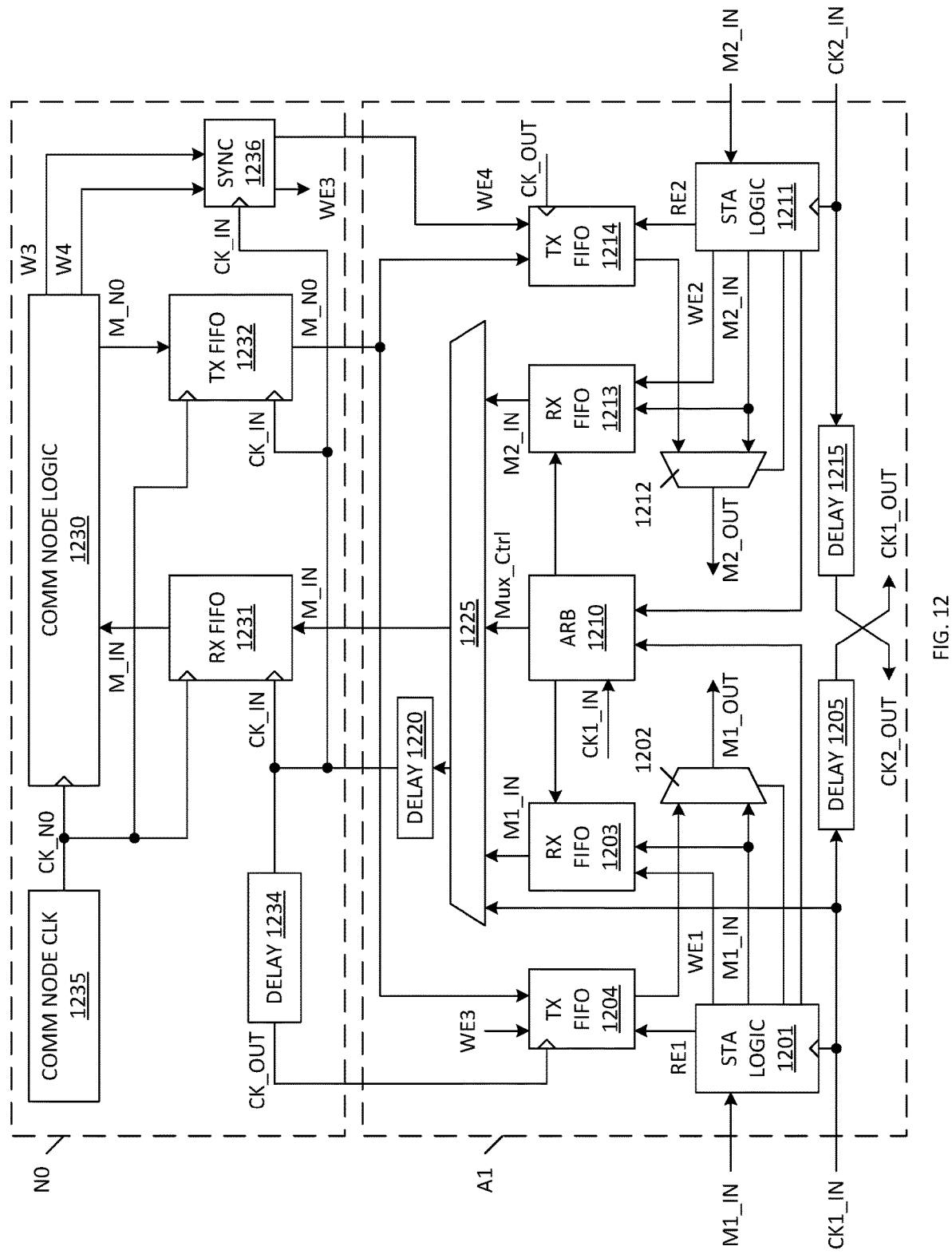
FIG. 12 is a block diagram illustrating a communication node and a corresponding data transport station in accordance with one embodiment of the present invention.

FIG. 12 is a simplified block diagram illustrating communication node N0 and data transport station A1 in accordance with one embodiment of the present invention.

Data transport station A1 includes station logic 1201, multiplexer 1202, receive FIFO 1203, transmit FIFO 1204 and delay line 1205, which are dedicated to the propagation of clockwise messages (e.g., M1_IN and M1_OUT) and a clockwise clock signal (e.g., CK1_IN and CK1_OUT) on communication channel 101. Data transport station A1 further includes station logic 1211, multiplexer 1212, receive FIFO 1213, transmit FIFO 1214 and delay line 1215, which are dedicated to the propagation of counter-clockwise messages (e.g., M2_IN and M2_OUT) and a counter-clockwise clock signal (e.g., CK2_IN and CK2_OUT) on communication channel 101. Arbitration logic 1210, delay line 1220 and multiplexer 1225 are used to account for conflicts between simultaneous messages received in the clockwise and counter-clockwise directions, and transmit messages/clock signal to communication node N0.

Communication node N0 includes communication node logic 1230, receive FIFO 1231, transmit FIFO 1232, delay line 1234, communication node clock generator 1235 and synchronizer circuit 1236. In general, communication node clock generator 1235 generates a local clock signal CK_N0, which is used to control most operations within communication node N0. For example, communication node logic 1230 controls the operations of communication node N0, including the reading of messages from receive FIFO 1231 and the writing of messages to transmit FIFO 1232, in response to the local clock signal CK_N0.

The 'clockwise' data transport circuitry will now be described in more detail. Note that the 'counter-clockwise' data transport circuitry operates in a similar manner.

There are two sets of source-synchronized interconnect buses associated with data transport station A1. In the clockwise direction, an incoming message M1_IN and source-synchronous clock signal CK1_IN are received from adjacent data transport station A2, and an outgoing message M1_OUT and source synchronous clock signal CK1_OUT are transmitted to adjacent data transport station A0. In the counter-clockwise direction, an incoming message M2_IN and source-synchronous clock signal CK2_IN are received from adjacent data transport station A0, and an outgoing message M2_OUT and source synchronous clock signal CK2_OUT are transmitted to adjacent data transport station A2. Both of these clock signals CK1_IN and CK2_IN are derived from the master clock signal CKA of the corresponding communication channel 101.

When the message M1_IN arrives at data transport station A1, it is latched by station logic circuitry 1201 in response to the source clock signal CK1_IN. Station logic 1201 determines whether the received message M1_IN targets (addresses) the data transport station A1. If so, station logic 1201 writes the received message M1_IN to receive FIFO 1203 (e.g., by activating a corresponding write enable signal WE1). In a similar manner, station logic 1211 writes counter-clockwise messages M2_IN that target data transport station A1 to receive FIFO 1213 (e.g., by activating a corresponding write enable signal WE2). Station logic circuits 1201 and 1211 inform arbitration circuit 1210 when messages are stored in receive FIFOs 1203 and 1213. In response, arbitration circuit 1210 controls read operations from receive FIFOs 1203 and 1213, and controls multiplexer 1225 to route either message M1_IN or M2_IN as message M_IN to the receive FIFO 1231 of communication node N0. The read operations implemented by arbitration circuit 1210 are performed in response to an arbitrarily selected one of the source clock signals CK1_IN or CK2_IN. In the illustrated example, arbitration circuit 1210 performs read operations from receive FIFOs 1203 and 1213 using the source clock signal CK1_IN. Arbitration circuit 1210 controls the read out of these messages M1_IN and M2_IN using a conventional arbitration policy, which specifies that as long as a message is present in either FIFO 1203 or 1213, a message will always be read out by arbitration circuit 1210. In this manner, messages stored in the receive FIFOs 1203 and 1213 are sent to communication node N0 serially using a pre-defined arbitration policy.

Arbitration circuit 1210 also controls multiplexer 1225 to route the source clock signal used to read messages from the receive FIFOs 1203 and 1213 (e.g., source clock signal CK1_IN in the present example) to delay line 1220, which delays the received clock signal to create the input clock signal CK_IN. The delay introduced by delay line 1220 is selected to maximize the set up and hold times with respect to the message M_IN.

The message M_IN is written in a source synchronous manner, wherein the message M_IN is latched into the receive FIFO 1231 in response to the input clock signal CK_IN. The message M_IN is subsequently read out of the receive FIFO 1231 to the control node logic 1230 in response to the local clock signal CK_N0.

If the received message M1_IN does not target data transport station A1 (i.e., the message 'hops' over data transport station A1), then station logic 1201 controls multiplexer 1202 to route the received message to data transport station A0 as the output message M1_OUT. Delay line 1205 introduces a delay to the source clock signal CK1_IN to generate the output clock signal CK1_OUT, which is also routed to data transport station A0. The delay line 1205 introduces a delay selected such that the message M1_OUT has an appropriate set up and hold time with respect to the output clock signal CK1_OUT (in the manner described above in connection with FIGS. 1B and 1C).

Communication node N0 may also generate messages to transmit to data transport station A1. In one embodiment, communication node logic 1230 generates a message M_N0, which is written to transmit FIFO 1232 in the clock domain of the local clock signal CK_N0. This message M_N0 is read from the transmit FIFO 1232 in the clock domain of the input clock signal CK_IN. Note that arbitration circuit 1210 always causes multiplexer 1225 to route the selected source clock signal CK1_IN to generate the input clock signal CK_IN, even if there are no messages M1_IN or M2_IN being received. The messages M_N0 read from transmit FIFO 1232 are provided to transmit FIFOs 1204 and 1214 in data transport station A1. Communication node logic 1230 provides write enable signals W3 and W4 to synchronizer circuit 1236, which synchronizes these write enable signals W3 and W4 with the input clock signal CK_IN, thereby creating synchronized write enable signals WE3 and WE4, respectively. These write enable signals WE3 and WE4 are provided to transmit FIFOs 1204 and 1214, respectively, wherein the write enable signals WE3 and WE4 allow communication node N0 to write the message M_N0 to the desired one of transmit FIFOs 1204 or 1214. The message M_N0 is written to the selected transmit FIFO 1204 or 1214 in a source synchronous manner using an output clock signal CK_OUT, which is a delayed version of the input clock signal CK_IN used to read the message M_N0 from the transmit FIFO 1232. In the illustrated example, delay line 1234 introduces an appropriate delay to the input clock signal CK_IN to generate the output clock signal CK_OUT, such that the set up and hold times with respect to the messages M_N0 read from transmit FIFO 1232 are maximized.

Assume that the message M_N0 is stored in transmit FIFO 1204. In this case, station logic 1201 activates a read enable signal RE1, which causes the message M_N0 to be read out to multiplexer 1202. Station logic 1202 controls multiplexer 1202 to route this message M_N0 on the communication channel 101 as the output message M1_OUT. Note that station logic 1201 ensures that this output message M1_OUT has the proper phase relationship with the corresponding output clock signal CK1_OUT. That is, the output message M1_OUT is routed such that the set up and hold times of this message are maximized with respect to the output clock signal CK1_OUT.

Station logic 1211 operates in a similar manner to read messages from transmit FIFO 1214 (using read enable signal RE2), and route these messages through multiplexer 1212 as the output message M2_OUT.

The embodiment of FIG. 12 advantageously minimizes the number of clock generators required to implement the permutated ring network of the present invention.

Figure 13:
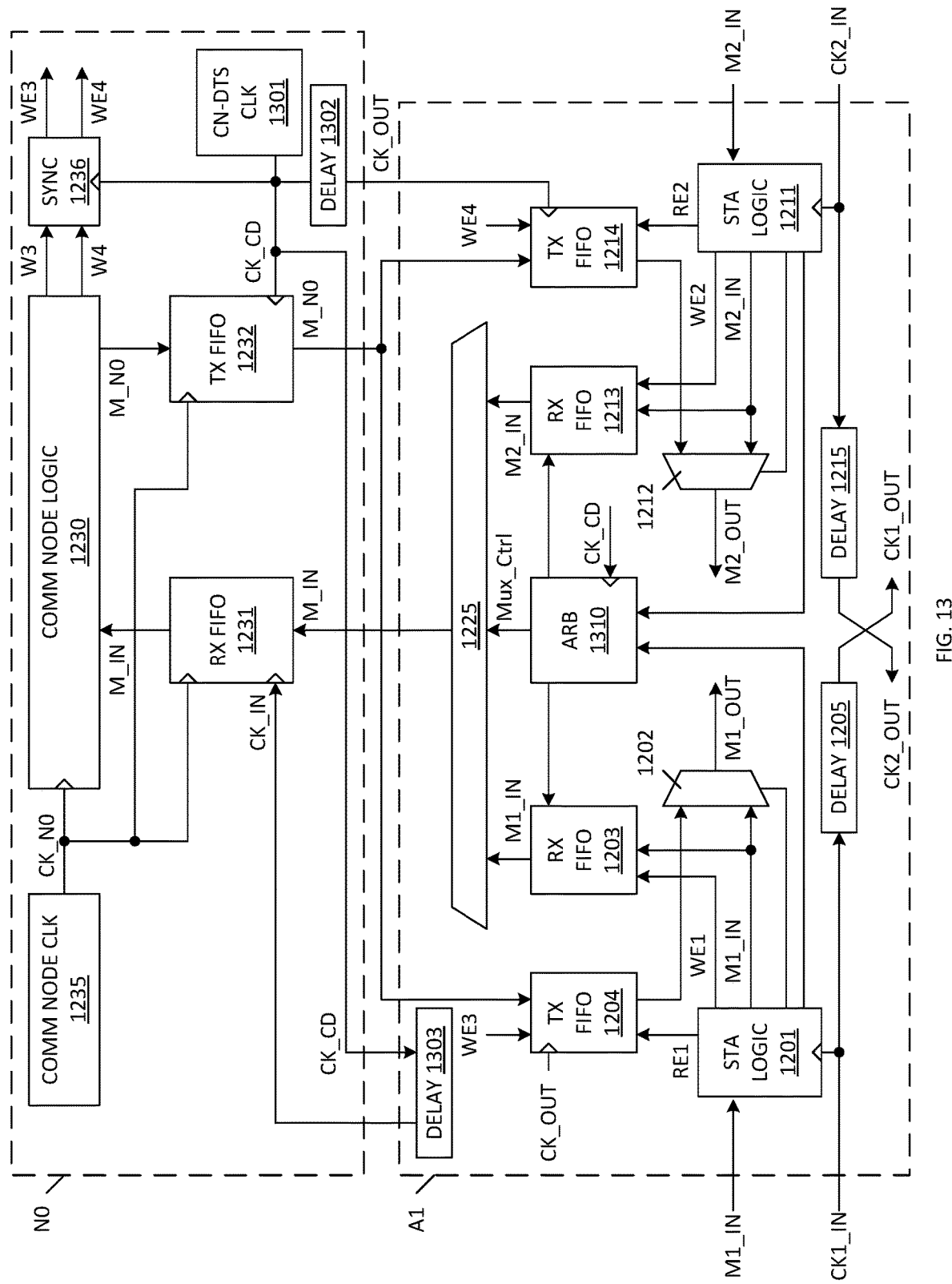
FIG. 13 is a block diagram illustrating a communication node and a corresponding data transport station in accordance with an alternate embodiment of the present invention.

FIG. 13 is a simplified block diagram illustrating communication node N0 and data transport station A1 in accordance with an alternate embodiment of the present invention. Similar elements in FIGS. 12 and 13 are labeled with similar reference numbers. Thus, the data transport station A1 of FIG. 13 includes station logic 1201, multiplexer 1202, receive FIFO 1203, transmit FIFO 1204 and delay line 1205, which are dedicated to the propagation of clockwise messages, and station logic 1211, multiplexer 1212, receive FIFO 1213, transmit FIFO 1214 and delay line 1215, which are dedicated to the propagation of counter-clockwise messages. Communication node N0 includes communication node logic 1230, receive FIFO 1231, transmit FIFO 1232 and communication node clock generator 1235 and synchronization circuit 1236, which have been described above in connection with FIG. 12.

In general, the communication node N0 of FIG. 13 includes a communication node to data transport station (CN-DTS) clock generation circuit 1301 that generates a local clock signal CK_CD, which is used to control the transfer of data between the communication node N0 and the data transport station A1. (This contrasts with the embodiment of FIG. 12, which use the clock signals CK1_IN and CK2_IN from the communication channel 101 to control the transfer of data between the communication node N0 and the data transport station A1.)

Thus, in the embodiment of FIG. 13, the CK_CD signal is used to read the message M_N0 from the transmit FIFO 1232 of communication node N0 to the transmit FIFOs 1204 and 1214 in data transport station A1. Delay line 1302 introduces a delay to the CK_CD clock signal, thereby generating a delayed output clock signal CK_OUT, which is provided to transmit FIFOs 1204 and 1214 in data transport station A1. The delay introduced by delay line 1302 is selected to maximize set up and hold time with respect to the message M_N0. Synchronization circuit 1236 synchronizes write enable signals W3 and W4 provided by communication node logic 1230 with the clock signal CK_CD, thereby providing write enable signals WE3 and WE4, respectively, which are provided to transmit FIFOs 1204 and 1214, respectively of the data transport station A1. The messages M_N0 are latched into transmit FIFOs 1204 and 1214 in a source synchronous manner in response to the write enable signals WE3 and WE4, respectively, and the output clock signal CK_OUT. Although the CK_CD clock signal is not needed by transmit FIFOs 1204 and 1214 if there are no messages M_N0 being transmitted, this CK_CD clock signal is continuously transmitted to the data transport station A1, because the data transport station A1 uses this CK_CD clock signal for source synchronous transfer of messages from the data transport station A1 to the communication node N0 (as described in more detail below).

The messages M1_IN and M2_IN received from the communication channel 101, and stored in receive FIFOs 1203 and 1213 of data transport station A1, are read out to multiplexer 1225 by arbitration circuit 1310. Arbitration circuit 1310 controls the read out of these messages M1_IN and M2_IN using a conventional arbitration policy, which specifies that as long as a message is present in either FIFO 1203 or 1213, a message will always be read out by arbitration circuit 1310.

Arbitration circuit 1310 controls multiplexer 1225 to selectively route the retrieved messages M1_IN and M2_IN to the receive FIFO 1231 of communication node N0 as the input message M_IN. In the embodiment of FIG. 13, arbitration circuit 1310 receives (and operates in the domain of) the CK_CD clock signal provided by communication node N0. Thus, messages are read out of receive FIFOs 1203 and 1213 in response to the CK_CD clock signal. Delay line 1303 within data transport station A1 introduces a delay to the CK_CD clock signal, thereby providing the input clock signal CK_IN, which is used to transfer the messages M_IN provided by multiplexer 1225 into the receive FIFO 1231 of communication node N0 in a source synchronous manner. The delay introduced by delay line 1303 is selected to maximize the set-up and hold time of this source synchronous transfer.

In accordance with one embodiment of the present invention, the frequency of the CK_CD clock signal is selected to optimize the bandwidth requirement between communication node N0 and data transport station A1. The CK_CD clock signal can have a frequency other than the frequency communication node domain clock signal CK_N0 and the frequency of the clock signals CK1_IN and CK2_IN of the communication channel 101. Moreover, the frequency of the CK_CD clock signal can be different within each of the communication nodes N0-N7. For example, in the embodiment described above in connection with FIGS. 1-4, which implements 8 communication nodes N0-N7 and three communication channels 101-103, communication nodes N4 and N5 can only communicate via data transport stations A4-A5 at 60% of the full bandwidth. In this example, the frequency of the CK_CD clock signal can be set to 60% of the frequency of the communication channel (e.g., 60% of CK1_IN or CK2_IN), and still provide the required data transfer capacity.

In the embodiment of FIGS. 9-11, which implements 8 communication nodes N0-N7 and four communication channels 101-104, the extra bandwidth of the permutated ring network 800 can be utilized by setting the frequency of the CK_CD clock signals in each of the communication nodes N0-N7 to a frequency faster than the frequency of the communication channels 101-104. In this manner, the embodiment of FIG. 13 provides great flexibility for optimizing the operating frequencies of the permutated ring network.

The permutated ring network architecture of the present invention can be scaled in both the number of communication nodes (N) and the number of communication channels (M). The operating frequency of the data transport stations will not be slowed down by scaling the permutated ring network architecture. In addition, scaling up the number of communication channels M will provide a highly non-linear improvement on the total bandwidth of the permutated ring network architecture.

The permutated ring network architecture of the present invention can be used to implement high bandwidth switch chips, provide an interconnect for a many-core system on a chip, provide an interconnect for graphics processor unit (GPU) chips, provide an interconnect for a system level FPGA, or implement coherence memory buses for high-performance multi-core and multi-banked last level cache memories.

Although the invention has been described in connection with several embodiments, it is understood that this invention is not limited to the embodiments disclosed, but is capable of various modifications, which would be apparent to a person skilled in the art. Accordingly, the present invention is limited only by the following claims.

The invention claimed is:

1. A permutated ring network comprising:
    a plurality of bi-directional source-synchronous ring networks, each having:
        a plurality of data transport stations connected in a ring,
        a first message bus for transmitting messages between the data transport stations in a first direction,
        a first clock path for transmitting a first clock signal between the data transport stations in the first direction, wherein the messages on the first message bus are latched in the data transport stations in response to the first clock signal in a source-synchronous manner,
        a second message bus for transmitting messages between the data transport stations in a second direction, opposite the first direction, and
        a second clock path for transmitting a second clock signal between the data transport stations in the second direction, wherein the messages on the second message bus are latched in the data transport stations in response to the second clock signal in a source-synchronous manner; and
    a plurality of communication nodes, wherein each of the communication nodes is coupled to one of the data transport stations in each of the plurality of bi-directional source-synchronous ring networks, wherein the communication nodes are coupled to data transport stations having different relative positions in the plurality of bi-directional source-synchronous ring networks.

2. The permutated ring network of claim 1, wherein each of the communication nodes includes a communication path to each of the other communication nodes, wherein each communication path is a 1-hop path between adjacent data transport stations.

3. The permutated ring network of claim 1, wherein a unique pair of adjacent data transport stations provides a communication path between each pair of the communication nodes.

4. The permutated ring network of claim 1, wherein the bi-directional source-synchronous ring networks operate in a first clock domain, and at least one of the communication nodes operates in a second clock domain, different than the first clock domain.

5. The permutated ring network of claim 1, further comprising a routing table that defines communication paths on the bi-directional source-synchronous ring networks for communications between each possible pair of the communication nodes.

6. A permutated ring network comprising:
    a plurality of bi-directional source-synchronous ring networks, each having a plurality of data transport stations connected in a ring;
    a plurality of communication nodes, wherein each of the communication nodes is coupled to one of the data transport stations in each of the plurality of bi-directional source-synchronous ring networks; and
    a routing table that defines communication paths on the bi-directional source-synchronous ring networks for communications between each possible pair of the communication nodes, wherein the routing table specifies a first group of the possible pairs of the communication nodes that communicate through paths on the bi-directional source-synchronous ring networks that include exactly two of the data transport stations, and a second group of the possible pairs of the communication nodes that communicate through paths on the bi-directional source-synchronous ring networks that include more than two of the data transport stations.

7. The permutated ring network of claim 6, wherein the first group includes pairs of communication nodes that require first communication bandwidths, and the second group includes pairs of communication nodes that require second communication bandwidths, wherein the first communication bandwidths are greater than the second communication bandwidths.

8. A permutated ring network comprising:
    a plurality of bi-directional source-synchronous ring networks, each having a plurality of data transport stations connected in a ring;
    a plurality of communication nodes, wherein each of the communication nodes is coupled to one of the data transport stations in each of the plurality of bi-directional source-synchronous ring networks; and
    a routing table that defines communication paths on the bi-directional source-synchronous ring networks for communications between each possible pair of the communication nodes, wherein the routing table specifies a first group of the possible pairs of the communication nodes that communicate through paths on a single one of the bi-directional source-synchronous ring networks, and a second group of the possible pairs of the communication nodes that communicate through paths on all of the bi-directional source-synchronous ring networks.

9. The permutated ring network of claim 1, wherein the permutated ring network includes at least three bi-directional source-synchronous ring networks.

10. The permutated ring network of claim 1, wherein communications between the data transport stations and the communication nodes is performed in a source-synchronous manner.

11. The permutated ring network of claim 1, wherein the data transport stations and the communication nodes are fabricated on a single integrated circuit chip.

12. A method of transporting data between a plurality of communication nodes on an integrated circuit chip, comprising:
 transmitting messages from the communication nodes to a plurality of bi-directional source-synchronous ring networks, wherein each of the bi-directional source-synchronous ring networks includes a plurality of data transport stations connected in a ring, and each of the communication nodes transmits messages to a data transport station in each of the bi-directional source-synchronous ring networks, wherein the communication nodes are coupled to data transport stations having different relative positions in the bi-directional source synchronous ring networks; and
 transmitting the messages in a source-synchronous manner between the data transport stations of the bi-directional source-synchronous ring networks.

13. The method of claim 12, wherein each of the communication nodes transmits messages to each of the other communication nodes, such that each of the messages is transmitted through exactly two of the data transport stations.

14. The method of claim 12, wherein a unique pair of adjacent data transport stations provides a communication path between each pair of the communication nodes.

15. The method of claim 12, further comprising:
 operating the bi-directional source-synchronous ring networks in a first clock domain; and
 operating at least one of the communication nodes in a second clock domain, different than the first clock domain.

16. The method of claim 12, further comprising maintaining a routing table that defines communication paths on the bi-directional source-synchronous ring networks for communications between each possible pair of the communication nodes.

17. The method of claim 12, further comprising:
 specifying a first group of pairs of the communication nodes that communicate through paths on the bi-directional source-synchronous ring networks that include exactly two of the data transport stations; and
 specifying a second group of pairs of the communication nodes that communicate through paths on the bi-directional source-synchronous ring networks that include more than two of the data transport stations.

18. The method of claim 17, wherein the first group includes pairs of the communication nodes that require first communication bandwidths, and the second group includes pairs of the communication nodes that require second communication bandwidths, wherein the first communication bandwidths are greater than the second communication bandwidths.

19. The method of claim 12, further comprising:
 specifying a first group of pairs of the communication nodes that communicate through paths on a single one of the bi-directional source-synchronous ring networks; and
 specifying a second group of pairs of the communication nodes that communicate through paths on all of the bi-directional source-synchronous ring networks.

20. The method of claim 12, wherein the plurality of bi-directional source-synchronous ring networks include at least three bi-directional source-synchronous ring networks.

21. The method of claim 12, further comprising performing communications between the data transport stations and the communication nodes in a source-synchronous manner.

22. The method of claim 12, wherein the data transport stations and the communication nodes are fabricated on a single integrated circuit chip.

* * * * *